April 23, 1935.  H. HUEBER ET AL  1,998,761
ACCESSORY SYSTEM FOR MOTOR VEHICLES
Filed March 17, 1932  2 Sheets-Sheet 1

INVENTORS
Henry Hueber &
Erwin C. Horton,
BY Bean & Brooks.
ATTORNEYS

April 23, 1935.     H. HUEBER ET AL     1,998,761
ACCESSORY SYSTEM FOR MOTOR VEHICLES
Filed March 17, 1932     2 Sheets-Sheet 2

INVENTORS
Henry Hueber &
BY  Erwin C. Horton.
Bean & Brooks.   ATTORNEYS

Patented Apr. 23, 1935

1,998,761

UNITED STATES PATENT OFFICE 1,998,761

ACCESSORY SYSTEM FOR MOTOR VEHICLES

Henry Hueber, Buffalo, and Erwin C. Horton, Hamburg, N. Y., assignors to Trico Products Corporation, Buffalo, N. Y.

Application March 17, 1932, Serial No. 599,562

7 Claims. (Cl. 60—60)

This invention relates to a windshield cleaner system and particularly to a fluid pressure operated windshield cleaner system primarily adapted for motor vehicles.

In the present day motor vehicle, driven by the internal combustion engine, the engine operation varies according to the speed of the motor vehicle and the change in the gear connections between the engine and the traction wheels, and consequently any moving part of the engine which is utilized for producing fluid pressure for the operation of accessories, such as the windshield cleaner, will have wide fluctuations in the degrees of pressure provided at different intervals. Thus, in the present day windshield cleaner system, which is operated from the suction derived from the intake manifold, the degree of available suction during engine operation varies according to the position of the engine throttle. At times the manifold suction is far in excess to that required for efficient operation of the windshield cleaner, and at other intervals the suction is wholly insufficient. It has been heretofore proposed to introduce in the suction line a tank or enlarged chamber which could be partially evacuated during the intervals of excessive pressure in an effort to tide the cleaner operation over periods of engine operation in which the manifold suction was insufficient to maintain the cleaner operating. This has, however, proved inadequate since the windshield cleaner would race and soon dissipate any vacuous condition in the chamber. Furthermore, the ball check valves heretofore employed have been inefficient when utilized to maintain a vacuous condition in the chamber by reason of their failure to prevent fluid flow from the manifold to the reserve chamber.

The present invention has for its object to provide a windshield cleaner system in which the excess pressure may be effectively maintained for predetermined controlled usage whereby a windshield cleaner or other accessory will function over a maximum interval of time.

Figure 1:
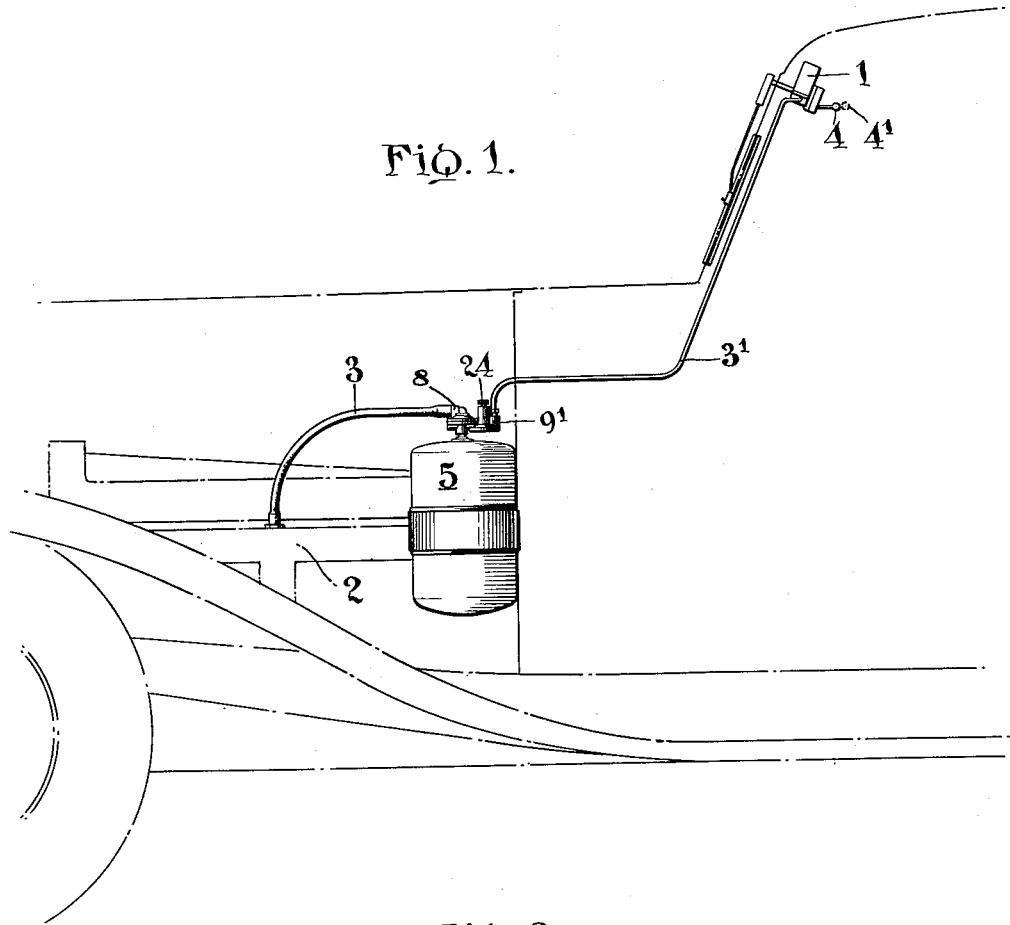
Fig. 1 is a view showing the invention applied to a motor vehicle.

Referring more in detail to the accompanying drawings, the numeral 1 designates a windshield cleaner of the fluid pressure type connected to a source of varying pressure, such as the intake manifold 2 by a conduit 3, there being employed in the line adjacent the windshield cleaner a manual control valve 4 movable from a fully closed position to a fully open position as indicated by the dotted showing 4', Fig. 1. The type of valve now used on the present day windshield cleaner is of the slide type, the movement of the valve being very small and the opened and closed positions are determined by a spring detent (not shown) so that it is difficult and rather a practical impossibility to control the speed of operation of the windshield cleaner by said valve. Consequently, when the valve 4 is opened the conduit 3 is likewise opened to its full capacity.

Provided in the conduit 3 is an enlarged chamber in the form of a tank 5. Connection with this chamber is made through a passage 6, a valve seat 7 and a nipple 8 leading off to the intake manifold or source of variable pressure. The passage 6 is provided with a branch passage 9 which opens through a valve seat 10 into a governor chamber 11, the latter being connected by means of the port 25 to the section 3' of the conduit 3 leading off to the windshield cleaner or other accessory.

Air or fluid is drawn from the chamber or tank 5, and also from the windshield cleaner, through the valve seat 7 which is normally closed by a valve 12. This valve is preferably a disc of heavy flexible fabric impervious to the passage of air therethrough and is given support by a flexible diaphragm-like member 13 perforated as by openings 14 to permit the ready flow of air therethrough. A light spring 15 interposed between the flexible support 13 and a shoulder 16 in the valve housing 17 serves to urge the valve to its seat. The spring preferably seats on the valve assembly opposite to the seat 7 for better sealing. By reason of the flexibility of the valve the latter will have full and complete engagement with its seat to thoroughly seal the valve port 7' against retrograde flow of fluid from the manifold into the tank. The pliant valve disc is preferably secured to its flexible support by a rivet or other fastener 12' which may be riveted over an anchoring washer 18. This mode of attachment leaves the marginal portions of the valve disc free to flex and yield into tight sealing contact with the seat. Furthermore, the valve has a broad face overlapping the seat 7 so that the higher pressure will have a surface of greater area than the seat to act on in holding the valve in sealing engagement.

In order to provide a controlled flow of air from the windshield cleaner into the chamber, or the branch passage communicating therewith, there is provided a valve 19 cooperating with the second valve seat 10 and adapted to be drawn thereto by a predetermined low pressure against the action of the unseating spring 20. A piston, herein depicted as a diaphragm 21, is provided in the chamber 11 and is acted upon on one side by the suction in the line 3 and on the opposite side by the outside atmosphere, a breather opening or port 22 being provided in the housing plate 11' for this purpose. This valve may be connected to the diaphragm to move therewith, or it may be a part thereof, although in the present showing it is shown separately thereof for economy in manufacture and construction. The valve is provided with a bleed passage or by-pass 23 which permits restricted passage over the valve seat in the event that the windshield cleaner should become blocked by snow or otherwise, such bleed passage permitting the full pressure of the source, or chamber, building up against the windshield cleaner for providing a maximum pressure differential to overcome such blocking resistance. The spring 20 has its tension adjusted by a screw 24 to thereby determine the pressure differential under which the valve 19 will open and close. Obviously, the valve 19 will move to and from its seat in accordance with increase and decrease, respectively, of the degree of suction acting on the upper side of the piston 21.

For compactness, and economy in construction, the valve chamber or housing 17 and the governor housing comprise a unit having a simple body construction with provision for attachment in the suction line. The seats 7 and 10 are formed on the unitary body 9' which has tri-connection with the two sections of the suction conduit and the chamber 5; the members 13 and 21 are mounted directly on the body in proximity to the chamber connection 6; and the mounting of the chamber 5 constitutes the mounting for the valve-governor unit. The conduit 3 between the chamber 5 and the intake manifold is preferably of greater capacity than that of the conduit section 3' between the chamber and the windshield cleaner so as to expedite the evacuation of said chamber. Especially is this advantageous on long grades when the engine throttle is usually open, since by releasing the throttle momentarily the chamber may be quickly evacuated.

Figure 2:
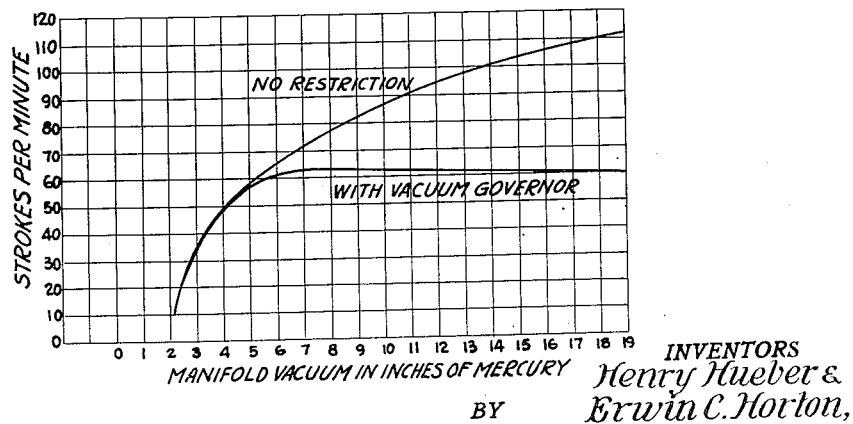
Fig. 2 is a graph illustrating, by way of comparison, the curves of wiper strokes with and without the present invention.
Figure 3:
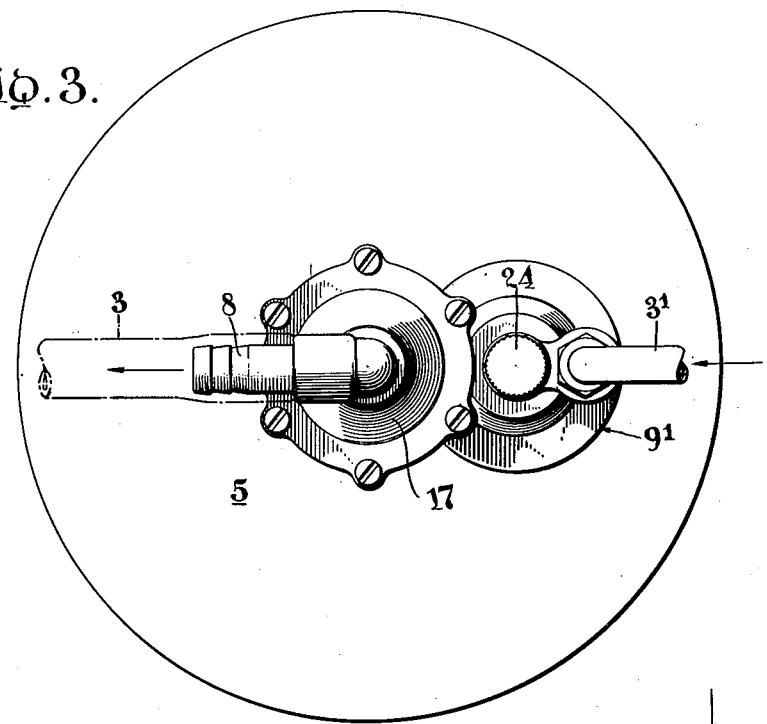
Fig. 3 is a plan view of the tank equipped with the control unit.
Figure 4:
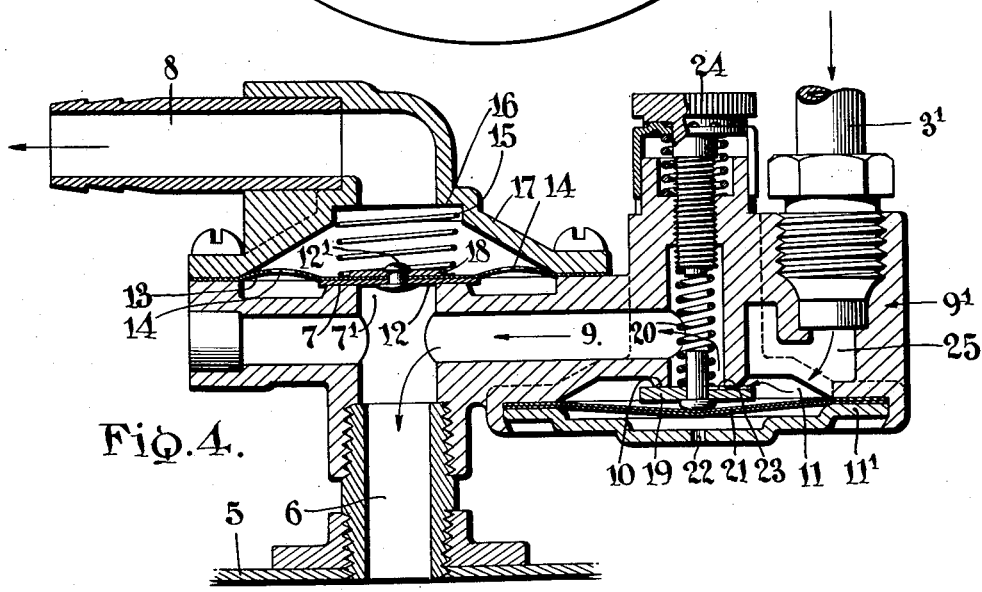
Fig. 4 is a sectional view therethrough.

As an example and with reference to Fig. 2, if the tank or line pressure is fifteen inches in vacuum on the mercury column and the suction required to efficiently operate the windshield cleaner is only five inches, then the adjustment of the automatic governor valve 19 will be such as to furnish the cleaner with a suction to maintain the cleaner operating at approximately sixty strokes per minute as distinguished from the uncontrolled operation in excess of one hundred strokes a minute. Consequently, there is a reserve in the chamber for periods of engine operation in which the degree of vacuum is less than that required to operate the windshield cleaner. During such periods the return flow of fluid from the manifold into the chamber is prevented by the flexible sealing valve.

This, therefore, affords a windshield cleaner system in which a definite speed of windshield cleaner operation is obtained and a conservation in the necessarily limited power supply for the cleaner is provided. While the governor will determine the normal operating pressure for the windshield cleaner the latter may have the benefit of the maximum power in the event that the cleaner becomes blocked or resisted in its operation, and in this respect the cleaner may be considered as free running. Consequently, while the windshield cleaner is operating under a normal pressure, which is automatically reduced and determined less than that provided by the source, the cleaner is permitted to have a free running maximum pressure when occasion may demand. However, after the obstruction to the cleaner action has been removed the governor will automatically reduce the suction to the prescribed efficient degree.

What is claimed is:

1. A control unit for a fluid conduit comprising a casing having a pair of chambers therein connected by a fluid passage, said passage terminating in valve seats facing into the chambers, an atmospheric port and a fluid inlet port opening into the first of said chambers, and a fluid outlet port opening into the second of said chambers, a fluid operable check valve in the second chamber for closing against the seat therein, a movable wall in the first chamber with the atmospheric port on one side of the wall and the fluid inlet port and valve seat on the opposite side of the wall, valve means for closing against the seat in said first chamber, said valve means being moved to seat by movement of the movable wall toward the seat, and resilient means for urging the valve means away from its seat.

2. A control device for a fluid conduit and suction reservoir, said device comprising casing means having a pair of chambers therein connected by a passage, said passage being adapted for connection to a suction reservoir and terminating in valve seats facing into the chambers, an atmospheric port and a fluid inlet port opening into the first of said chambers, and a fluid outlet port opening into the second of said chambers, a fluid operable check valve in the second chamber for closing against the seat therein, a movable wall in the first chamber with the atmospheric vent on one side of the wall and the fluid inlet port and valve seat on the opposite side of the wall, valve means for closing against the seat in said first chamber, said valve means being moved to seat by movement of the movable wall toward the seat, and resilient means for urging the valve means away from its seat.

3. A control device for a fluid conduit and suction reservoir, said device comprising casing means having a pair of chambers therein connected by a passage, said passage being adapted for connection to a suction reservoir and terminating in valve seats facing into the chambers, an atmospheric port and a fluid outlet port opening into the second of said chambers, a fluid operable check valve in the second chamber for closing against the seat therein, a valve in said first chamber for closing against the valve seat therein, and means controlled by the fluid pressure in said first chamber for moving said last mentioned valve toward the seat when such fluid pressure decreases to a predetermined degree below atmospheric pressure.

4. A control unit for a suction conduit comprising a casing having a pair of fluid passages joined by a chamber, the first of said passages terminating at the chamber in a valve seat facing into the chamber, an atmospheric vent opening into said chamber, a movable wall extending across the chamber with the pair of fluid passages disposed to one side of the wall and the atmospheric chamber disposed to the other side of the wall, valve means in the chamber for closing against the valve seat, said valve means being movable to seated position by and upon movement of the movable wall toward the seat, and resilient means for urging the valve means away from the seat.

5. A control device for interposition in a suction conduit having a suction reservoir associated therewith, comprising casing means defining a passage and valve chambers at the ends of the passage, means for connecting the passage to the reservoir, a check valve in one chamber permitting only unidirectional flow of fluid into the passage, a valve in the other chamber controlled by the degree of suction in said other chamber for limiting the degree of suction therein to a predetermined maximum, and a by-pass between the passage and said other chamber for permitting limited fluid flow therebetween when the last mentioned valve is closed.

6. In an accessory system for motor vehicles, a suction operable accessory, a source of variable suction, a suction reservoir chamber, a conduit connecting the latter to the accessory, a second conduit connecting the chamber to said source, a check valve in the second passage permitting flow of fluid only in the direction toward the source, and valve means in the first mentioned conduit and responsive to the degree of suction in the conduit between such valve means and the accessory, for restricting the flow of fluid from the accessory to the chamber when the degree of suction to which the valve means is responsive exceeds a predetermined degree.

7. A control unit for a suction conduit comprising a casing having a pair of fluid passages joined by a chamber, the first of said passages terminating at the chamber in a valve seat facing into the chamber, an atmospheric vent opening into said chamber, a movable wall extending across the chamber with the pair of fluid passages disposed to one side of the wall and the atmospheric chamber disposed to the other side of the wall, valve means in the chamber for closing against the valve seat, said valve means being movable to seated position by and upon movement of the movable wall toward the seat, resilient means for urging the valve means away from the seat, and a by-pass between the chamber and the first of said passages for permitting limited fluid flow therebetween when the valve means is closed against the valve seat.

HENRY HUEBER.
ERWIN C. HORTON.